US007327681B2

(12) United States Patent
Rhee et al.

(10) Patent No.: US 7,327,681 B2
(45) Date of Patent: Feb. 5, 2008

(54) ADMISSION CONTROL METHOD IN INTERNET DIFFERENTIATED SERVICE NETWORK

(75) Inventors: Woo Seop Rhee, Daejon (KR); Jea Hoon Yu, Daejeon (KR); Hyeong Ho Lee, Daejeon (KR); Sang Ha Kim, Daejeon (KR); Jun Hwa Lee, Daejeon (KR); Il Woo Lee, Daejeon (KR); Mi Jeong Yang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1002 days.

(21) Appl. No.: 10/465,439

(22) Filed: Jun. 19, 2003

(65) Prior Publication Data

US 2004/0081092 A1 Apr. 29, 2004

(30) Foreign Application Priority Data

Oct. 23, 2002 (KR) ...................... 10-2002-0064904

(51) Int. Cl.
*H04J 1/16* (2006.01)
(52) U.S. Cl. .................. 370/235; 370/237; 370/395.21
(58) Field of Classification Search ................ 370/230, 370/235, 237, 395.2, 395.21; 341/51
See application file for complete search history.

(56) References Cited

U.S. PATENT DOCUMENTS 6,584,111 B1* 6/2003 Aweya et al. ............... 370/412
6,847,626 B1* 1/2005 Carneal et al. ............. 370/345
2003/0028641 A1* 2/2003 Zhang et al. ............... 709/226
2003/0103510 A1* 6/2003 Svanberg et al. ........ 370/395.2

FOREIGN PATENT DOCUMENTS

| KR | 1020010054846 | 7/2001 |
| KR | 1020020056112 | 7/2002 |
| WO | WO 00/30295 | 5/2000 |

OTHER PUBLICATIONS

Rhee et al. (paper 1, The 8th International Conference on Communication Systems, vol. 1, Nov. 25-28, 2002. p. 128-132).*

(Continued)

*Primary Examiner*—Seema S. Rao
*Assistant Examiner*—Wanda Z Russell
(74) *Attorney, Agent, or Firm*—Blakely, Sokoloff, Taylor & Zafman

(57) ABSTRACT

The present invention provides an admission control method in an Internet differentiated service network, for dividing an admission control function executed at an ingress edge node into a path level and a link level, performing a path level admission control function at an ingress edge node without communication with a bandwidth broker by enabling the path level to use a specific bandwidth being initially allocated to a corresponding path by a bandwidth broker, and performing a link level admission control function through the use of a measurement based admission control method by enabling the link level to be allocated a bandwidth of an unused other service using a movable boundary method when the initially allocated path level bandwidth is completely used.

9 Claims, 5 Drawing Sheets

OTHER PUBLICATIONS

Rhee et al. (paper 2, IEEE International Conference on Communications, 2003, ICC '03. vol. 3, May 11-15, 2003).*

IEEE Infocom 2000, Admission control Based on End-to-End Measurements, pp. 623-630.

Admission control mechanism using measurement based dynamic provisioning in IP networks, pp. 137-141, 2000.

IEICE Trans. Commun., vol. E84-B, No. 8, Aug. 2001, pp. 2011-2025.

Proc. of the 8th International Workshop on Quality of Service (IEEE, IWQoS 2000), Pittsburgh, PA, USA, Jun. 2000, 10 pages.

* cited by examiner

ADMISSION CONTROL METHOD IN INTERNET DIFFERENTIATED SERVICE NETWORK

BACKGROUND OF THE INVENTION

1. Field of the Invention

The present invention relates to an admission control method in an Internet differentiated service network, and more particularly to an admission control method in an Internet differentiated service network, which performs an admission control function by integratedly applying a bandwidth broker function, a movable boundary function, and a measurement based admission control function to an Internet differentiated service network.

2. Description of the Prior Art

In recent times, following the current trend of rapidly developing data transmission technology, Internet networks using an xDSL or a metro Ethernet, etc. are increasingly developed to have a broadband and a variety of Internet multimedia contents are also increasingly developed. So, a variety of application services requiring QoS (Quality Of Service) guarantee, for example, an Internet broadcasting service, a VoIP (Voice over IP) service, and a VPN (Virtual Private Network) service, are newly introduced to the market. As a result, QoS guarantee technology in an Internet network has become a popular research subject to provide Internet service users with various services.

Therefore, QoS guarantee technologies for satisfying bandwidth requirements, transmission reliability, and real-time characteristics in order to support service applications having a variety of requirements should be proposed in an Internet network.

There are various kinds of QoS guarantee technologies providable in an IP (Internet Protocol) network, for example, an admission control method, a congestion control method, and traffic shaping/metering/marking/scheduling methods, etc. The most important method among the aforementioned methods associated with the QoS guarantee technologies is the admission control method. The purpose of the admission control method is to allocate network resources in such a way that reliable paths for ensuring packet loss probability or delay requirement requested by a user can be provided in such a network.

There have been widely studied two kinds of conventional arts related to such an admission control method, that is, a parameter based admission control method and a measurement based admission control method. In more detail, the parameter based admission control method performs an admission control function with reference to a plurality of parameters, i.e., a peak rate, a mean rate, and a delay variation, etc., which are proposed by a signaling protocol in the case where a user establishes a connection setup request in a telephone network or packet network.

The measurement based admission control method performs an admission control function by measuring the used amount of traffic on a current link. There are two kinds of such a measurement based admission control method, that is, a data packet measurement method and a probing packet measurement method. The data packet measurement measures data traffic being currently transmitted, predicts the future traffic based on the measured data traffic, and finally performs an admission control function. The probing packet measurement method determines whether there is a sufficient bandwidth in each node on a path by previously transferring a plurality of probing packets corresponding to the amount of traffic requested by a connection setup procedure to a network, and then performs an admission control function.

In addition, another admission control function of a centralized management method using a bandwidth broker has also been used in a conventional art. In this case, a bandwidth broker determines whether a service requested by a user is accepted, and performs an intra-network resource allocation. Presently, a static provisioning method is adapted to perform network resource management using a bandwidth broker. The static provisioning method allocates such network resources to a specified routing path predetermined by a SLA (Service Level Agreement) in an off-line state at intervals of a predetermined time (e.g., day, week, or month), and determines admission or denial on the basis of a new connection request entered by a user.

On the other hand, a dynamic provisioning method allows the bandwidth broker to periodically receive network status information from each node contained in a network, and the received network status information is reflected in a resource allocation procedure. As a result, the dynamic provisioning method dynamically varies a resource allocation procedure according to such a network status or routing variance, and finally performs an admission control function on the basis of a new connection request entered by a user.

The parameter based admission control method among the aforementioned conventional admission control methods has a scalability problem when it is applied to an Internet network, because parameter and status information related to each connection requested from each edge node of intra-network ingresses should be managed in all the nodes. Therefore, the parameter based admission control method has limitations in that it is not applied to a large-sized Internet-core network. Further, the measurement based admission control method has difficulty in estimating an input traffic on the basis of a mean arrival rate of a steady state related to the input traffic, thereby causing an inaccurate admission control operation.

In the meantime, the above static provisioning method using a bandwidth broker causes data congestion because it is not adapted to a network status such as dynamically variable Internet traffic or routing, and does not effectively use network resources because changes in network resource allocation are established at intervals of a predetermined time. A currently investigated dynamic provisioning method requires complicated bandwidth management information to enable a bandwidth broker to manage even bandwidth of an intra-network link level, and should periodically receive an intra-network congestion state or the used amount of a link's bandwidth from each node, thereby correcting related information.

One representative example related to such an admission control method has been described in a PCT application No. PCT/US99/27380, entitled "PROVIDING ADMISSION CONTROL AND NETWORK QUALITY OF SERVICE WITH A DISTRIBUTED BANDWIDTH BROKER", which is incorporated herein by reference. This PCT application performs an admission control function using local bandwidth information through the use of a local bandwidth broker distributed to each node for satisfying user's QoS requirements in an Internet network such that each node contained in a network performs an admission control function using a control message. However, the above PCT application has disadvantages in that it should use a control message for bandwidth reservation as in a signaling method of a conventional packet switching system and should store status and session information for the bandwidth reservation.

A measurement based admission control mechanism based on an end-to-end probing packet and a performance analysis thereof have been proposed by Viktoria Elek, who has published a research paper entitled "CONTROL BASED ON END-TO-END MEASUREMENT" in an IEEE INFORCOM2000 Proceeding pp. 623~630 on April 2000. The measurement based admission control mechanism transmits probing packets equal to the amount of bandwidths to be transmitted by a transmitter over the Internet to a receiver during a probing period, and then receives information related to such a probing packet transmission. In this case, if the reception information has a better QoS than a target QoS, the mechanism establishes connection setup admission. However, this mechanism also has a disadvantage in that an additional Queue should be contained in a core network to discriminate between a probing packet and a data packet and a priority queue management method should be used.

Further, an admission control method using a dynamic bandwidth allocation method based on a quota in a bandwidth broker has been proposed by Zhi-Li Zhang, who has published a research paper entitled "ON SCALABLE DESIGN OF BANDWIDTH BROKERS" in an IEICE Trans. Commun., Vol. E84-B No.8, pp. 2011~2025 on August 2000. This admission control method manages a QoS status with a path level and a link level through the use of a bandwidth broker, and initially allocates bandwidths to a path in quota units to perform an admission control function. Thereafter, after using all of the allocated quotas, the admission control method determines whether a new quota is allocatable to all the links on a path. If it is determined that a new quota is allocatable to them, the admission control method establishes allocation of such a new quota such that it performs an admission control function. However, the above admission control method has a problem related to a value of the quota unit, and should investigate bandwidths of all the links on a path to perform a new quota allocation when quotas allocated to the path are all used.

SUMMARY OF THE INVENTION

The present invention provides an admission control method in an Internet differentiated service network, for dividing an admission control function executed at an ingress edge node of the Internet differentiated service network into a path level and a link level, performing a path level admission control function at an ingress edge node without communication with a bandwidth broker by enabling the path level to use a specific bandwidth being initially allocated to a corresponding path by a bandwidth broker, and performing a link level admission control function through the use of a measurement based admission control method by enabling the link level to be allocated a bandwidth of an unused other service using a movable boundary method when the initially allocated path level bandwidth is completely used.

It is another object of the present invention to provide an admission control method for integratedly applying a bandwidth broker function, a movable boundary function, and a measurement based admission control function to an Internet differentiated service network, for enabling a bandwidth broker to manage only a bandwidth related to a path level to accomplish simple bandwidth management in such a way that it is applicable to an Internet-core network, and immediately accommodating intra-network traffic changes by transferring information related to congestion generation in a specific link on a path to an ingress edge node.

In accordance with one aspect of the present invention, the above and other objects can be accomplished by the provision of an admission control method in an Internet differentiated service network including a bandwidth broker, a plurality of ingress and egress edge nodes, and a plurality of core nodes, including the steps of: a) dividing an admission control procedure performed at the plurality of ingress edge nodes into a path level and a link level, and enabling the bandwidth broker to allocate an initial path level bandwidth related to the ingress edge nodes; b) enabling a congestion-associated core node to perform a congestion control procedure when a congestion state exists in a specific link on a path, and informing the plurality of ingress edge nodes of the congestion state via the bandwidth broker; c) upon receiving a connection setup request for a new flow, performing a path level admission control function at the ingress edge nodes on the path level by employing a path level bandwidth being initially allocated to each service of a corresponding path via a bandwidth broker; and d) if the initially allocated path level bandwidth is completely used, enabling the link level to be allocated a bandwidth of an unused best-effort service using a movable boundary method, and performing a link level admission control function through the use of a measurement based admission control method.

In accordance with another aspect of the present invention, there is provided a computer-readable recording medium which stores a program for executing first to fourth functions in an admission control procedure in an Internet differentiated service network including a bandwidth broker, a plurality of ingress and egress edge nodes, and a plurality of core nodes, the first function for dividing an admission control procedure performed at the plurality of ingress edge nodes into a path level and a link level, and enabling the bandwidth broker to allocate an initial path level bandwidth related to the ingress edge nodes; the second function for enabling a congestion-associated core node to perform a congestion control procedure when a congestion state exists in a specific link on a path, and informing the plurality of ingress edge nodes of the congestion state via the bandwidth broker; the third function for performing a path level admission control function at the ingress edge nodes on the path level by employing a path level bandwidth being initially allocated to each service of a corresponding path via a bandwidth broker, upon receiving a connection setup request for a new flow; and the fourth function for, if the initially allocated path level bandwidth is completely used, enabling the link level to be allocated a bandwidth of an unused best-effort service using a movable boundary method, and performing a link level admission control function through the use of a measurement based admission control method.

Preferably, the admission control method in an Internet differentiated service network may perform an admission control function by integratedly applying a bandwidth broker function, a movable boundary function, and a measurement based admission control function in such an Internet differentiated service network.

Preferably, the admission control method divides an admission control function executed at an ingress edge node of the Internet differentiated service network into a path level and a link level, performs a path level admission control function at an ingress edge node without communication with a bandwidth broker by enabling the path level to use a specific bandwidth being initially allocated to a corresponding path by a bandwidth broker, and performs a link level admission control function through the use of a measurement based admission control method by enabling the link level to be allocated a bandwidth of an unused other service using a movable boundary method when the initially allocated path level bandwidth is all used.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
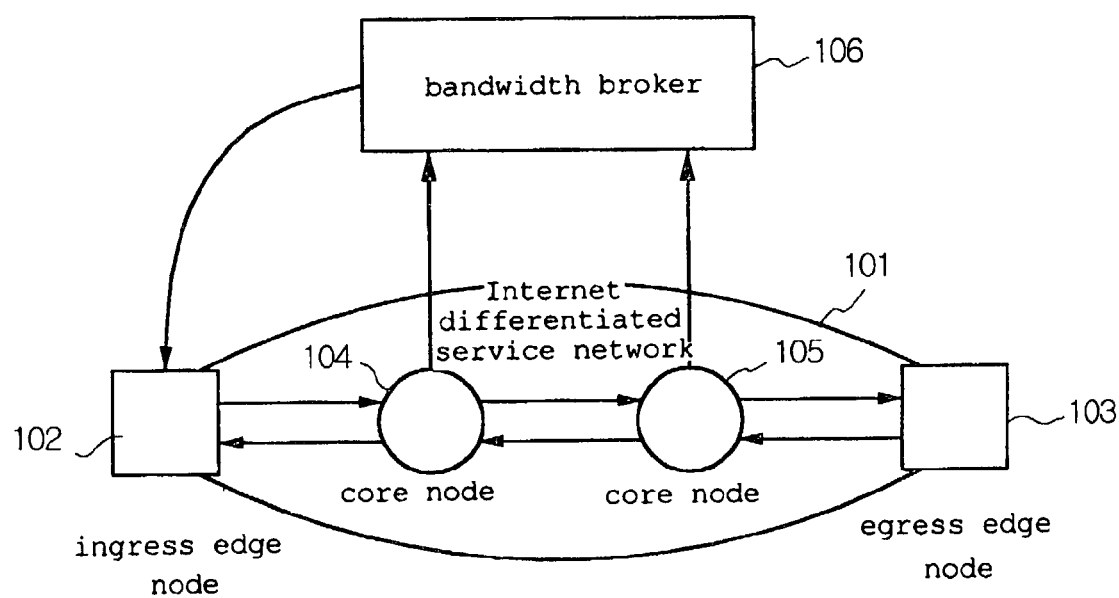
FIG. 1 is a view illustrating a block diagram of an Internet differentiated service network in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a view illustrating a block diagram of an Internet differentiated service network in accordance with a preferred embodiment of the present invention. Referring to FIG. 1, an Internet differentiated service network 101 is comprised of an ingress edge node 102, an egress edge node 103, core nodes 104 and 105, and a bandwidth broker 106. Although FIG. 1 depicts a single ingress edge node 102 and a single egress edge node 103 for the convenience of description, the number of edge nodes 102 and 103 can be preferably extended to any practical number. Likewise, the number of core nodes 104 and 105 can also be extended to any practical number.

The bandwidth broker 106 performs an initial path level bandwidth allocation for the plurality of ingress edge nodes 102. In the case where the bandwidth broker 106 receives information related to congestion generation from the plurality of core nodes 104 and 105, it informs all the ingress edge nodes 102 of the information. The ingress edge node 102 is informed of an initial path level bandwidth related to each path from the bandwidth broker 106, and performs a path level admission control function without communication with the bandwidth broker 106. In the case where the initially allocated path level bandwidth is all used, the ingress edge node 102 is allocated an unused best-effort service bandwidth using a movable boundary method, and finally performs a link level admission control function through the use of a measurement based admission control method.

Also, in the case where the ingress edge node 102 is informed of congestion state information of the core nodes 104 and 105 from the bandwidth broker 106, it denies a connection setup request for a path by way of associated links. The core nodes 104 and 105 respectively check a buffer state of each link of a node. In this case, if the amount of packets contained in a buffer is over a threshold value, the core nodes 104 and 105 inform the bandwidth broker 106 of a congestion state. If the used amount of bandwidth for each service is lower than the threshold value, the core nodes 104 and 105 inform the bandwidth broker 106 of a congestion release signal. In this manner, many links are contained in such nodes, and congestion information is generated from such links. As a result, such nodes inform a bandwidth broker 106 of a congestion state of a specific link where data congestion occurs, and thus informs a path by way of the link causing such a data congestion of such a congestion state.

As described above, the present invention classifies an admission control method executed at an ingress edge node 102 of a differentiated service network into a path level admission control method and a link level admission control method, and separately performs the path level admission control method and the link level admission control method in the ingress edge node 102. Also, if a specific link on a path causes a congestion state, then the core nodes 104 and 105 immediately inform a bandwidth broker 106 of congestion state information. Then, the bandwidth broker 106 transmits again the received congestion state information to the ingress edge node 102 such that the congestion state information is reflected in an admission control procedure.

The bandwidth broker 106 simplifies a bandwidth management procedure because it manages only a bandwidth related to a path level, and immediately accommodates intra-network traffic differences because congestion generation information of a specific link on a path is immediately transferred to an ingress edge node 102. In addition, an admission control function is performed on a path level without communication with the bandwidth broker 106 in such a way that a quick admission control can be provided on the path level.

Meanwhile, a link level can effectively use a bandwidth using a movable boundary method and a measurement based admission control method, thereby satisfying user's QoS requirements and minimizing the number of communication messages between a bandwidth broker and each node.

Figure 2:
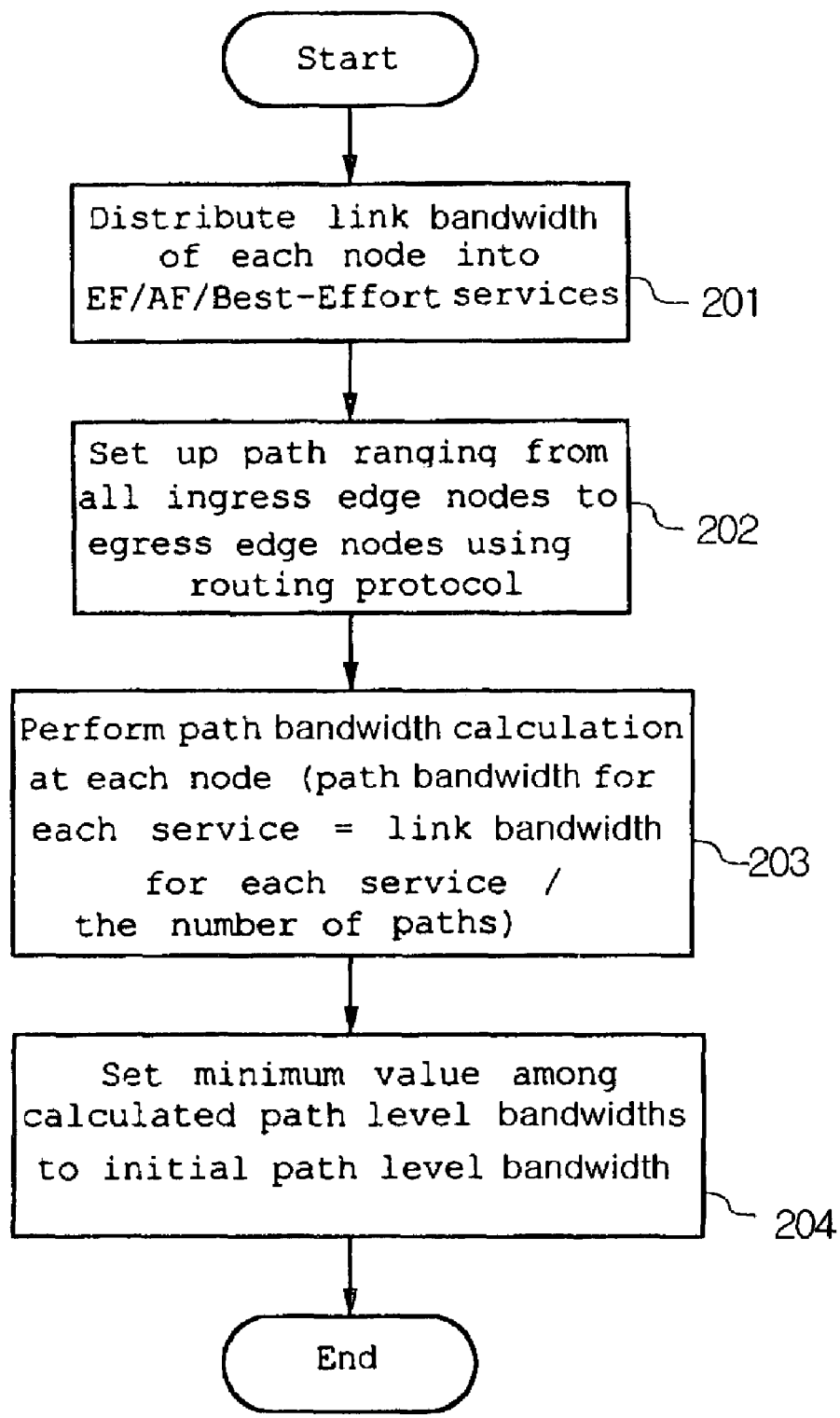
FIG. 2 is a flow chart illustrating an initial path level bandwidth allocation procedure in a bandwidth broker in accordance with a preferred embodiment of the present invention.

FIG. 2 is a flow chart illustrating an initial path level bandwidth allocation procedure in a bandwidth broker in accordance with a preferred embodiment of the present invention. Referring to FIG. 2, link bandwidths of all the nodes contained in an Internet differentiated service network are distributed into an EF (Expedited Forwarding) service, an AF (Assured Forwarding) service, and a best-effort service at step 201. A bandwidth broker sets up a path from all ingress edge nodes 102 of a network to all egress edge nodes 103 of the network by performing a routing protocol at step 202, and then performs a path bandwidth calculation for each service of nodes at step 203. In this case, the path bandwidth calculation is performed at step 203 by dividing the link bandwidth for each service distributed at the step 201 by the number of paths being set up at the step 202, thereby providing a prescribed equation,. i.e., a path bandwidth for each service=a link bandwidth for each service=the number of paths for each service. Then, the initial path level bandwidth selects a minimum value from among a plurality of path bandwidths for services calculated in the step 203 in association with nodes on a path at step 204. In this manner, the bandwidth broker 106 allocates the minimum value of path bandwidths for each service selected at the step 204 to the ingress edge node 102 as an initial path level bandwidth.

Figure 3:
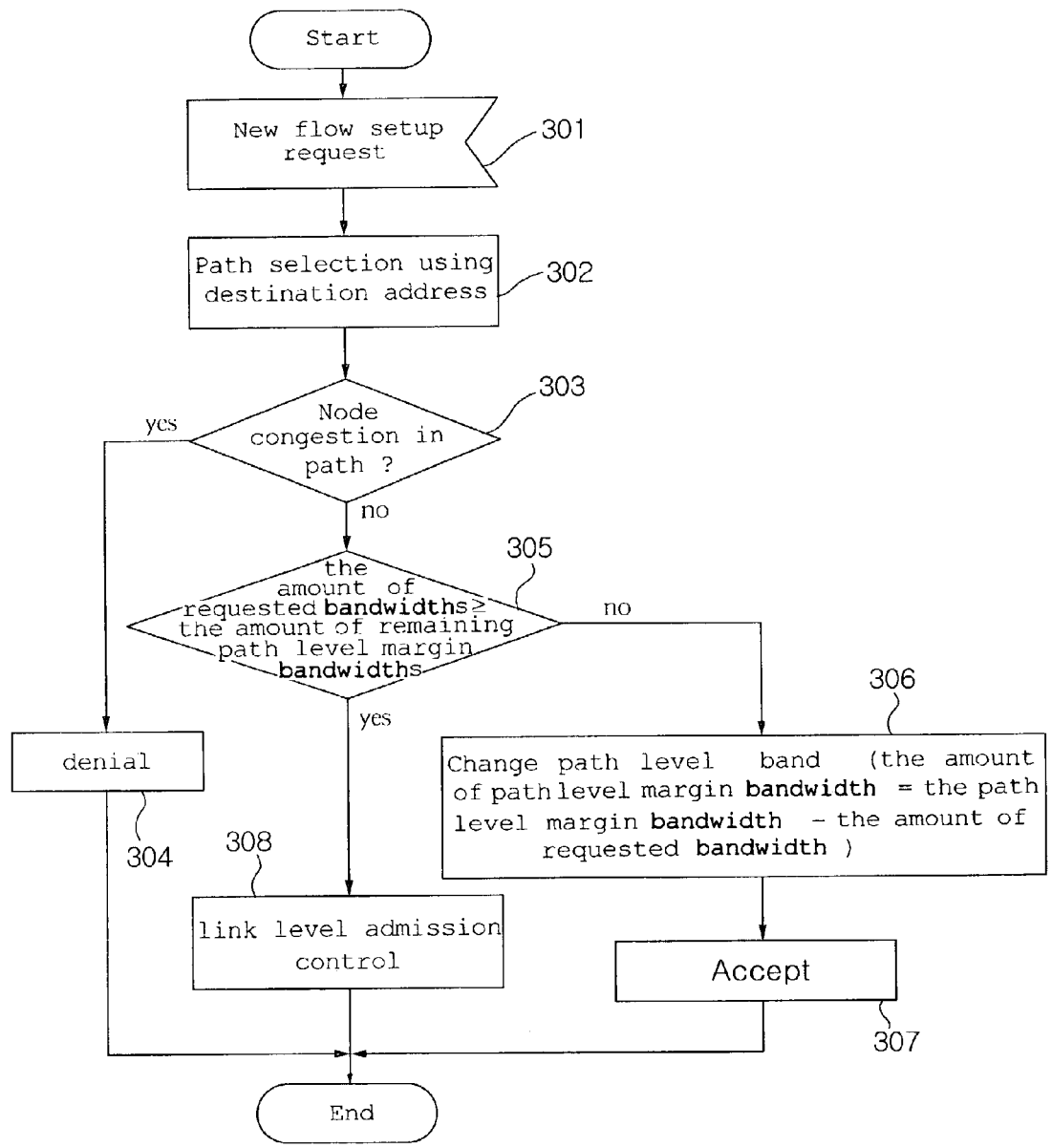
FIG. 3 is a flow chart illustrating a path level admission control procedure at an ingress edge node in accordance with a preferred embodiment of the present invention.

FIG. 3 is a flow chart illustrating a path level admission control procedure at an ingress edge node in accordance with a preferred embodiment of the present invention. Referring to FIG. 3, if a new flow setup request enters an ingress edge node 102 at step 301, the path level admission control procedure selects an appropriate path using a destination address at step 302, and checks a congestion state of the selected path at step 303. If nodes of the path are congested at step 303, then the flow setup request is denied at step 304. If the nodes of the path are not congested at step 303, then it is determined at step 305 whether the amount of the remaining path level bandwidth is greater than the amount of requested bandwidth.

If the amount of the path level remaining bandwidth is greater than the amount of requested bandwidth of the new flow at step 305, the amount of requested bandwidth is subtracted from the amount of path level remaining bandwidth and a path level bandwidth change is performed at step 306, and then the new flow setup request is accepted at step 307. On the other hand, if the amount of path level remaining bandwidth is lower than the amount of requested bandwidths at step 305, a link level admission control function is performed at step 308. In this way, in case of a path level admission control procedure at an ingress edge node 102, an admission control operation at the ingress edge node 102 is performed without communication with a bandwidth broker 106 using a predetermined bandwidth initially allocated to a corresponding path by the bandwidth broker 106.

Figure 4A:
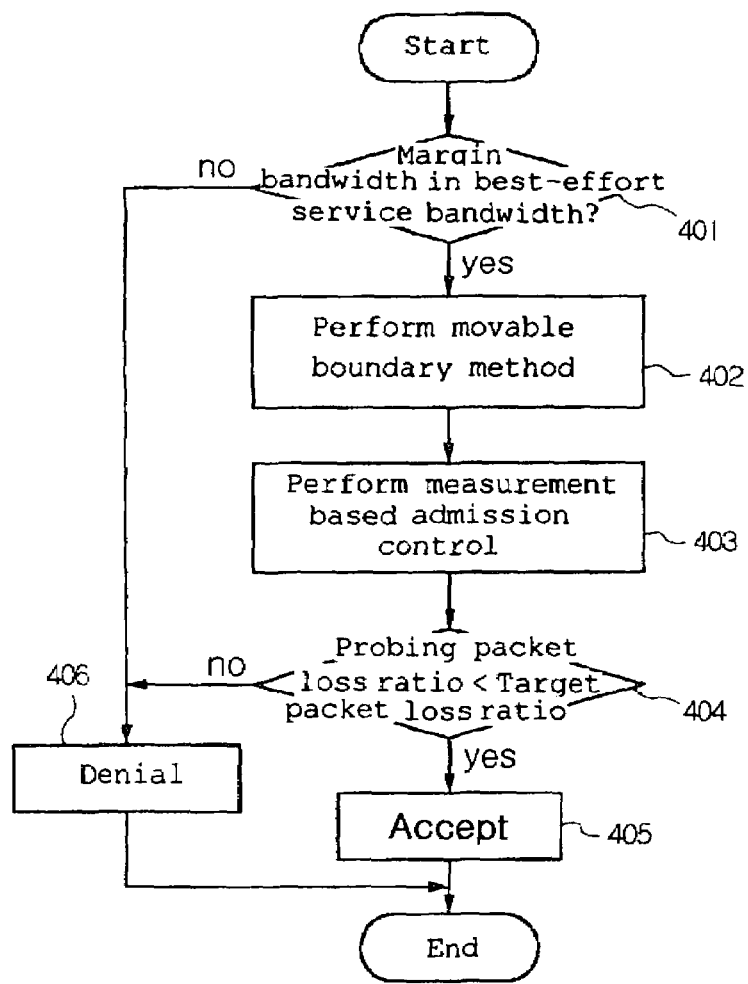
FIG. 4a is a flow chart illustrating a link level admission control procedure at an ingress edge node in accordance with a preferred embodiment of the present invention.

FIG. 4a is a flow chart illustrating a link level admission control procedure at an ingress edge node in accordance with a preferred embodiment of the present invention. Referring to FIG. 4a, in the case where bandwidths allocated to an initial path level are all used by a path level admission control procedure, a link level admission control procedure is performed. Firstly, the link level admission control procedure checks at step 401 whether there is an usable bandwidth in a best-effort service bandwidth.

If it is determined at step 401 that there is an usable bandwidth in the best-effort service bandwidth, a movable boundary method for extending the range of bandwidth to an unused bandwidth of the best-effort service bandwidth is performed at step 402. Thereafter, a measurement based admission control procedure is performed at step 403 to determine whether the extended bandwidth satisfies a target performance value. A probing packet loss ratio caused by the step 403 is compared with a predetermined target packet loss ratio at step 404. If the probing packet loss ratio is lower than the predetermined target packet loss ratio at step 404, a new flow setup request is accepted at step 405.

In the meantime, in the case where it is determined at step 401 that there is no margin bandwidth in the best-effort service bandwidth or it is determined at step 404 that the probing packet loss ratio generated by a measurement based admission control method is higher than the target packet loss ratio, the requested target performance cannot be satisfied such that a new flow setup request is denied at step 406.

In this way, a link level admission control procedure at the ingress edge node 102 is allocated a bandwidth of an unused other service using a movable boundary method when path bandwidths being initially allocated by the bandwidth broker 106 are all used, thereby performing an admission control function through the use of a measurement based admission control method.

Figure 4B:
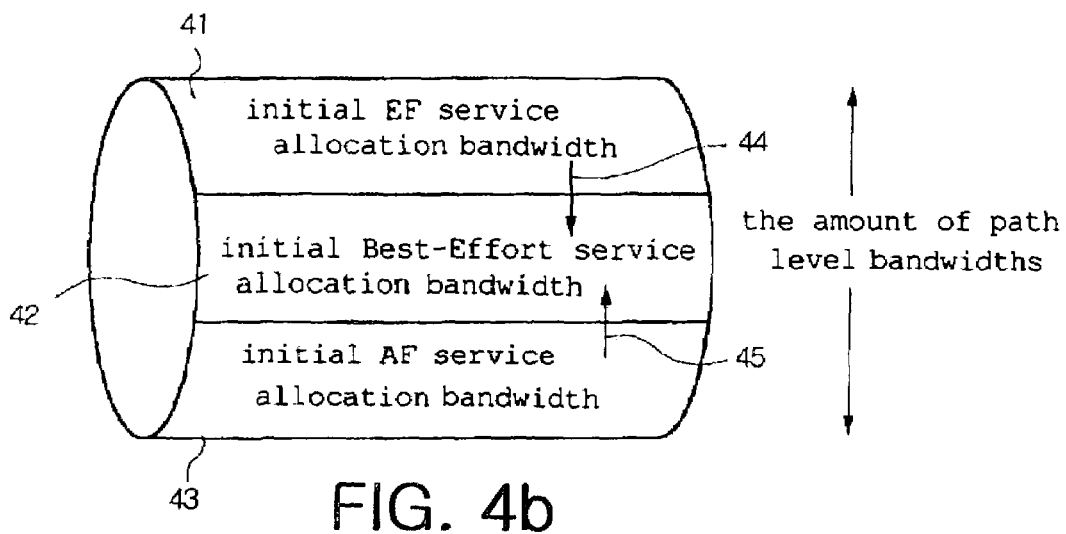
FIG. 4b is an exemplary view illustrating a movable boundary method of FIG. 4a in accordance with a preferred embodiment of the present invention.

FIG. 4b is an exemplary view illustrating a movable boundary method of FIG. 4a in accordance with a preferred embodiment of the present invention. Referring to FIG. 4b, a path level bandwidth is initially allocated to each service. Reference numerals 41, 42 and 43 indicate an initial EF service allocation bandwidth, an initial best-effort service allocation bandwidth, and an initial AF service allocation bandwidth, respectively. In this case, as previously described in FIG. 4a, a movable boundary method extends the EF and AF services to an unused bandwidth of the best-effort service in a link level admission control procedure. Herein, extended bandwidths of the EF and AF services are indicated as reference numerals 44 and 45, respectively.

Figure 5:
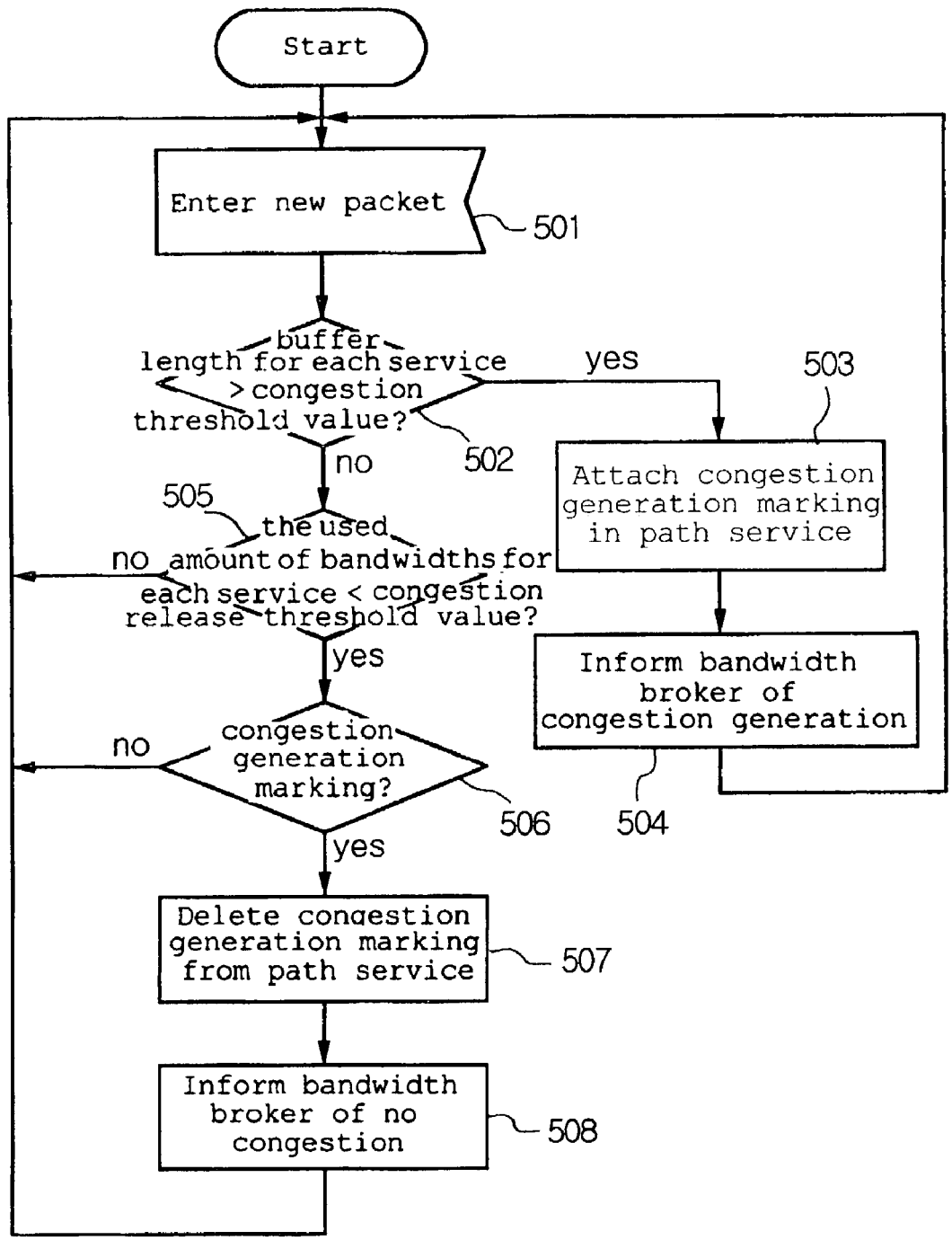
FIG. 5 is a flow chart illustrating a congestion control procedure in an Internet differentiated service network in accordance with a preferred embodiment of the present invention.

FIG. 5 is a flow chart illustrating a congestion control procedure in an Internet differentiated service network in accordance with a preferred embodiment of the present invention. A link congestion control procedure on a path will hereinafter be described with reference to FIG. 5. If a new packet enters core nodes 104 and 105 from an ingress edge node 102 in an Internet differentiated service network, it is determined at step 502 whether a buffer length for each service is longer than a predetermined congestion threshold value.

If it is determined at step 502 that the buffer length for each service is longer than the predetermined congestion threshold value, a congestion generation marking is performed to a service of a corresponding path at step 503, such a congestion generation is informed to a bandwidth broker 106 at step 504, and then the link congestion control procedure waits for a new packet entry. If it is determined at step 502 that the buffer length for each service is below the predetermined congestion threshold value, it is determined at step 505 whether the used amount of bandwidth for each service is less than a predetermined congestion release threshold value.

If it is determined at step 505 that the used amount of bandwidth for each service is greater than the predetermined congestion release threshold value, the link congestion control procedure waits for a new packet entry. If it is determined at step 505 that the used amount of bandwidth for each service is less than the predetermined congestion release threshold value, the link congestion control procedure determines at step 506 whether the congestion generation marking is detected. If it is determined at step 506 that the congestion generation marking is not detected, the link congestion control procedure waits for a new packet entry. If it is determined at step 506 that the congestion generation marking is detected, the link congestion control procedure deletes a congestion generation marking from a service of a corresponding path at step 507, informs a bandwidth broker 106 of a congestion release status at step 508, and then waits for a new packet entry. Such link congestion control procedures are repeated when a new packet enters core nodes 104 and 105, and the bandwidth broker informs all the ingress edge nodes of congestion generation information transmitted from the core nodes 104 and 105.

As apparent from the above description, an admission control method in an Internet differentiated service network in accordance with the present invention enables a bandwidth broker to manage only a bandwidth related to a path level to accomplish simple bandwidth management, and immediately accommodates intra-network traffic differences by transferring information related to congestion generation in a specific link on a path to an ingress edge node through the use of the bandwidth broker.

Also, the admission control method in the Internet differentiated service network quickly performs an admission control operation by establishing an admission control function without communication with a bandwidth broker on a path level, and performs a movable boundary method and a measurement based admission control method on a link level to use an unused best-effort service bandwidth of a path, thereby effectively using an entire transmission bandwidth and satisfying user's QoS requirements.

Further, the number of exchanges of communication messages between a bandwidth broker and each node can be minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An admission control method in an Internet differentiated service network including a bandwidth broker, a plurality of ingress and egress edge nodes, and a plurality of core nodes, comprising the steps of:
   a) separating an admission control procedure performed at the plurality of ingress edge nodes into a path level process performed by the bandwidth broker and a link level process separated from the bandwidth broker, and enabling the bandwidth broker to allocate an initial path level bandwidth related to the ingress edge nodes;
   b) enabling a congestion-associated core node to perform a congestion control procedure when a congestion state exists in a specific link on a path, and informing the plurality of ingress edge nodes of the congestion state via the bandwidth broker;
   c) upon receiving a connection setup request for a new flow, performing a path level admission control function at the ingress edge nodes on the path level by employing a path level bandwidth being initially allocated to each service of a corresponding path via a bandwidth broker; and
   d) if the initially allocated path level bandwidth is completely used, enabling the link level to be allocated a bandwidth of an unused best-effort service using a movable boundary method, and performing a link level admission control function through the use of a measurement based admission control method.

2. The admission control method according to claim 1, wherein the step (a) for allocating the initial path level bandwidth includes the steps of:
   a1) partitioning link bandwidths of all nodes in the Internet differentiated service network into an EF (Expedited Forwarding) service, an AF (Assured Forwarding) service, and a best-effort (BE) service;
   a2) setting up a path from all the ingress edge nodes to all the egress edge nodes by performing a routing protocol;
   a3) dividing each service's link bandwidth partitioned in the step (a1) by the number of paths being set up in the step (a2), and performing a path bandwidth calculation for each service of the nodes; and
   a4) selecting a minimum value from among a plurality of path bandwidths for services of the nodes, and setting the minimum value to an initial path level bandwidth.

3. The admission control method according to claim 1, wherein the step (b) for performing the congestion control procedure includes the steps of:
   b1) upon receiving a new packet at a specific core node, determining whether a buffer length for each service is longer than a predetermined congestion threshold value;
   b2) if it is determined that the buffer length for each service is longer than the predetermined congestion threshold value, attaching a congestion generation marking to a service of a corresponding path, and informing a bandwidth broker of a congestion state;
   b3) if it is determined that the buffer length for each service is below the predetermined congestion threshold value, determining whether the used amount of bandwidth for each service is lower than a predetermined congestion release threshold value;
   b4) if it is determined that the used amount of bandwidth for each service is lower than the predetermined congestion release threshold value, determining whether the congestion generation marking is attached; and
   b5) if it is determined that the congestion generation marking is attached, deleting the congestion generation marking from a service of a corresponding path, and informing the bandwidth broker of a congestion release status.

4. The admission control method according to claim 1, wherein the step (c) includes the steps of:
   c1) upon receiving a new flow setup request at the ingress edge nodes, selecting a path using a destination address, and checking a congestion state of the selected path;
   c2) denying the new flow setup request if it is determined that nodes of the path are congested, and determining whether the amount of remaining path level bandwidth is greater than the amount of requested bandwidth if it is determined that no congestion exists;
   c3) if the amount of the path level remaining bandwidth is greater than the amount of requested bandwidth of the requested new flow, subtracting the amount of requested bandwidth from the amount of path level remaining bandwidth, performing a path level bandwidth change operation, and admitting the new flow setup request; and
   c4) if the amount of path level remaining bandwidth is lower than the amount of requested bandwidth, performing a link level admission control function.

5. The admission control method according to claim 4, wherein the movable boundary method, in case of performing the link level admission control function in an initial path level bandwidth allocated to each of an initial EF service, an initial AF service, and an initial best-effort service, extends the EF service and the AF service to an unused bandwidth of the best-effort service.

6. The admission control method according to claim 1, wherein the step (d) for performing the link level admission control function includes the steps of:
   d1) if a bandwidth allocated to an initial path level is completely used by the path level admission control procedure, determining whether there is an usable bandwidth in a best-effort service bandwidth;

d2) if it is determined that there is a margin bandwidth in the best-effort service bandwidth, extending the range of bandwidth to an unused bandwidth of the best-effort service bandwidth;

d3) performing a measurement based admission control procedure to determine whether the extended bandwidth satisfies a target performance value, and comparing a probing packet loss ratio caused by the measurement based admission control procedure with a predetermined target packet loss ratio;

d4) if the probing packet loss ratio is lower than the predetermined target packet loss ratio, admitting the new flow setup request; and d5) if it is determined that there is no margin bandwidth in the best-effort service bandwidth or it is determined that the probing packet loss ratio generated by the measurement based admission control procedure is higher than the target packet loss ratio, denying the new flow setup request.

7. The admission control method according to claim 1, wherein the ingress edge nodes denies a connection setup request for a path by way of associated links, upon receiving congestion state of the core nodes from the bandwidth broker.

8. The admission control method according to claim 1, wherein the bandwidth broker manages only a bandwidth related to the path level.

9. A computer-readable recording medium for storing a computer program during an admission control procedure in an Internet differentiated service network including a bandwidth broker, a plurality of ingress and egress edge nodes, and a plurality of core nodes, said computer-readable recording medium comprising:

a first function for separating an admission control process performed at the plurality of ingress edge nodes into a path level process performed by the bandwidth broker and a link level process separated from the bandwidth broker, and enabling the bandwidth broker to allocate an initial path level bandwidth related to the ingress edge nodes;

a second function for enabling a congestion-associated core node to perform a congestion control procedure when a congestion state exists in a specific link on a path, and informing the plurality of ingress edge nodes of the congestion state via the bandwidth broker;

a third function for performing a path level admission control function at the ingress edge nodes on the path level by employing a path level bandwidth being initially allocated to each service of a corresponding path via a bandwidth broker, upon receiving a connection setup request for a new flow; and a fourth function for, if the initially allocated path level bandwidth is completely used, enabling the link level to be allocated a bandwidth of an unused best-effort service using a movable boundary method, and performing a link level admission control function through the use of a measurement based admission control method.

* * * * *